(12) United States Patent
Bulpitt

(10) Patent No.: US 10,119,321 B2
(45) Date of Patent: Nov. 6, 2018

(54) AUTOMATIC WINDOW SYNCHRONIZATION SYSTEM

(71) Applicant: Toyota Motor Engineering & Manufacturing North America, Inc., Erlanger, KY (US)

(72) Inventor: Christopher M. Bulpitt, Los Angeles, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 3 days.

(21) Appl. No.: 15/212,583

(22) Filed: Jul. 18, 2016

(65) Prior Publication Data

US 2018/0016837 A1   Jan. 18, 2018

(51) Int. Cl.
| | | |
|---|---|---|
| E05F 15/79 | (2015.01) | |
| E05F 15/60 | (2015.01) | |
| B60J 1/17 | (2006.01) | |
| E05F 15/695 | (2015.01) | |
| E05F 15/70 | (2015.01) | |

(52) U.S. Cl.
CPC ............... *E05F 15/79* (2015.01); *B60J 1/17* (2013.01); *E05F 15/60* (2015.01); *E05F 15/695* (2015.01); *E05F 15/70* (2015.01); *E05Y 2400/32* (2013.01); *E05Y 2400/36* (2013.01); *E05Y 2400/42* (2013.01); *E05Y 2400/44* (2013.01); *E05Y 2400/445* (2013.01); *E05Y 2900/55* (2013.01)

(58) Field of Classification Search
CPC .............................................. E05F 2017/005
See application file for complete search history.

(56) References Cited

U.S. PATENT DOCUMENTS

| | | | |
|---|---|---|---|
| 4,328,451 A | | 5/1982 | Barge |
| 4,899,063 A | | 2/1990 | Suck |
| 5,129,192 A | * | 7/1992 | Hannush ............ B60H 1/00821 |
| | | | 236/49.3 |
| 5,483,135 A | | 1/1996 | Parks |
| 6,060,794 A | | 5/2000 | Takagi et al. |
| 6,111,373 A | | 8/2000 | Ohashi |
| 6,169,379 B1 | | 1/2001 | Zhang et al. |

(Continued)

FOREIGN PATENT DOCUMENTS

| | | |
|---|---|---|
| DE | 19757231 | 7/1999 |
| GB | 979050 | 12/1960 |
| KR | 178591 | 11/1998 |

*Primary Examiner* — Catherine A Kelly
(74) *Attorney, Agent, or Firm* — Snell & Wilmer LLP

(57) ABSTRACT

A system for automatically synchronizing window openings and closings of multiple windows of a vehicle. The system includes a first actuator and a second actuator configured to move a first window and a second window to respective closed positions. The system includes a window control unit configured to receive, at a first time, an indication to close the first window at a first closing rate. The window control unit is configured to receive, at a second time, an indication to close the second window at a second closing rate. The window control unit is configured to adjust at least one of the first closing rate or the second closing rate, from a standard rate to an adjusted rate, when the first time and the second time are within a threshold time, such that the first window and the second window achieve their respective closed positions simultaneously.

20 Claims, 11 Drawing Sheets

(56) References Cited

U.S. PATENT DOCUMENTS

| | | | | |
|---|---|---|---|---|
| 6,249,097 B1 * | 6/2001 | Frey | ............. | H02P 7/2913 |
| | | | | 318/257 |
| 6,253,135 B1 | 6/2001 | Hubacher | | |
| 6,541,929 B2 * | 4/2003 | Cregeur | ............. | E05F 15/689 |
| | | | | 160/291 |
| 6,630,807 B2 * | 10/2003 | Pehrson | ............. | B60J 7/0573 |
| | | | | 318/445 |
| 6,759,817 B2 * | 7/2004 | Mersch | ............. | E05F 15/695 |
| | | | | 318/34 |
| 6,773,053 B2 | 8/2004 | Richter et al. | | |
| 7,071,637 B2 * | 7/2006 | Mersch | ............. | E05F 15/695 |
| | | | | 318/280 |
| 7,476,818 B2 | 1/2009 | Nam | | |
| 7,615,944 B2 * | 11/2009 | Ubelein | ............. | B60J 1/17 |
| | | | | 318/264 |
| 7,877,180 B2 * | 1/2011 | Turner | ............. | E05F 15/71 |
| | | | | 318/280 |
| 2004/0145327 A1 | 7/2004 | Gruber et al. | | |
| 2017/0204649 A1 * | 7/2017 | Iacovoni | ............. | B60J 1/17 |

\* cited by examiner

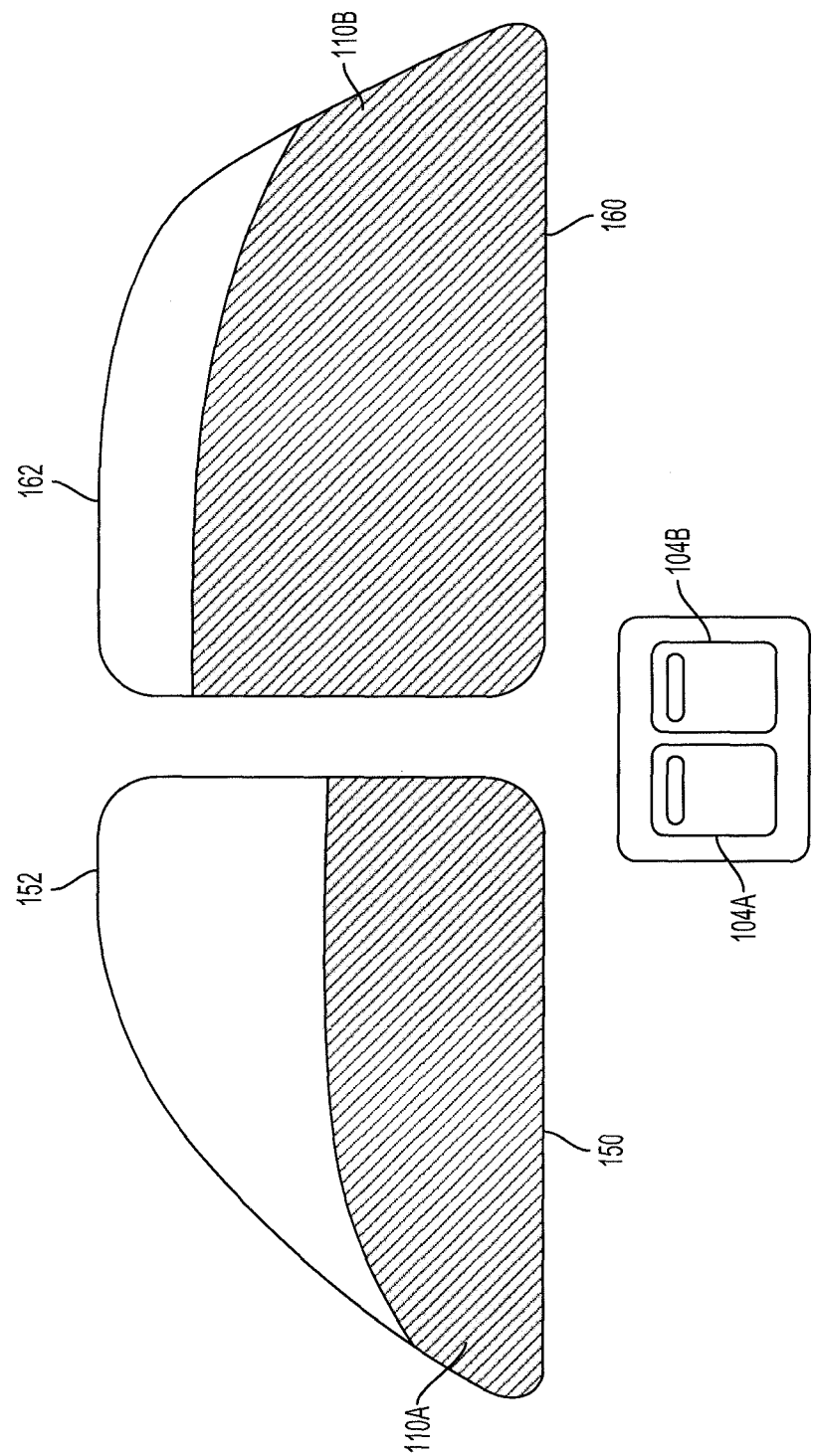

AUTOMATIC WINDOW SYNCHRONIZATION SYSTEM

BACKGROUND

1. Field

The present disclosure relates to a system and a method for controlling windows, and more particularly to a system and a method for automatically synchronizing the opening and closing of vehicle windows.

2. Description of the Related Art

A vehicle, such as an automobile, may have one or more windows capable of being opened or closed. In some vehicles, a driver or a passenger of the vehicle may open or close the windows manually by turning a window crank. In others, the driver or the passenger of the vehicle may use electric windows or power windows to open or close the windows. In a vehicle with power windows, a window switch controls the up and down movement of a corresponding window. When a window is closed in a vehicle with power windows, an audible thud may be produced when the window achieves a closed position. In some vehicles, multiple window switches may be located close to each other, and a driver or a passenger may activate or use two or more window switches at the same time in order to close multiple windows. In some situations, the driver or the passenger may not activate the switches at precisely the same time or the windows may be at different starting heights, resulting in multiple window closing thuds. The thuds are generally caused by the windows closing at different times. These thuds may be loud and undesirable, as they may be unpleasant to hear or cause one's ears to experience discomfort. Thus, there is a need for a system and a method for automatically synchronizing the opening and closing of vehicle windows.

SUMMARY

What is described is a system for automatically synchronizing the opening and/or the closing of a first window and a second window of a vehicle. The system includes a first actuator configured to move the first window to a first window closed position. The system also includes a second actuator configured to move the second window to a second window closed position. The system also includes a window control unit connected to the first actuator and the second actuator. The window control unit is configured to receive, at a first time, an indication to close the first window. The window control unit is also configured to close the first window at a first closing rate based on the indication to close the first window, the first closing rate being a standard rate. The window control unit is also configured to receive, at a second time, an indication to close the second window. The window control unit is also configured to close the second window at a second closing rate based on the indication to close the second window, the second closing rate being the standard rate. The window control unit is also configured to adjust at least one of the first closing rate or the second closing rate, from the standard rate to an adjusted rate, when the first time and the second time are within a threshold time, such that the first window closed position and the second window closed position are achieved simultaneously.

Also described is a vehicle having a first window and a second window and providing automatically synchronizing window closings. The vehicle includes a first actuator configured to move the first window to a first window closed position. The vehicle also includes a second actuator configured to move the second window to a second window closed position. The vehicle also includes a window control unit connected to the first actuator and the second actuator. The window control unit is configured to receive an indication to close the first window at a first time. The window control unit is also configured to close the first window in response to receiving the indication to close the first window. The window control unit is also configured to receive an indication to close the second window at a second time. The window control unit is also configured to close the second window in response to receiving the indication to close the second window. The window control unit is configured to adjust at least one of the closing of the first window or the closing of the second window, when the first time and the second time are within a threshold time, such that the first window closed position and the second window closed position are achieved simultaneously.

Also described is a method for synchronizing movement of a first window and a second window of a vehicle. The method includes receiving, by a window control unit at a first time, an indication to move (i.e., up or down) the first window. The method also includes moving, by the window control unit, the first window at a first rate based on the indication to move the first window, the first rate being a standard rate. The method also includes receiving, by the window control unit at a second time, an indication to move the second window. The method also includes moving, by the window control unit, the second window at a second rate based on the indication to move the second window, the second rate being the standard rate. The method also includes adjusting, by the window control unit, at least one of the first rate or the second rate, from the standard rate to an adjusted rate, when the first time and the second time are within a threshold time, such that the first window and the second window achieve a position simultaneously.

BRIEF DESCRIPTION OF THE DRAWINGS

Other systems, methods, features, and advantages of the invention will be or will become apparent to one of ordinary skill in the art upon examination of the following figures and detailed description. It is intended that all such additional systems, methods, features, and advantages be included within this description, be within the scope of the invention, and be protected by the accompanying claims. Component parts shown in the drawings are not necessarily to scale, and may be exaggerated to better illustrate the important features of the invention. In the drawings, like reference numerals designate like parts throughout the different views, wherein:

FIG. 1B illustrates a first window, a second window, a first window switch and a second window switch, according to an embodiment of the invention;

DETAILED DESCRIPTION

Figure 1A:
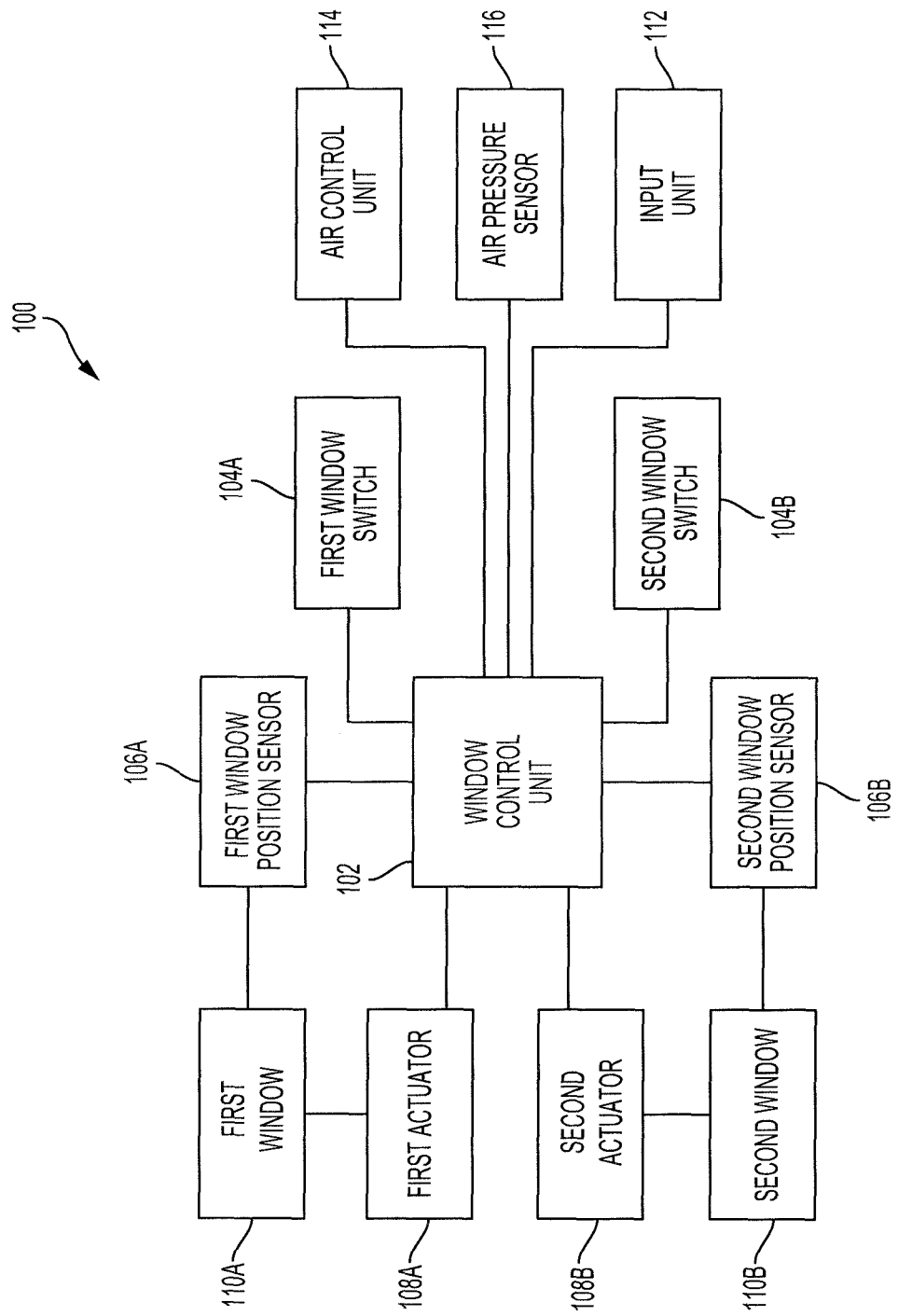
FIG. 1A depicts a block diagram of an automatic window synchronization system for a vehicle, according to an embodiment of the invention.

Disclosed herein are systems and methods for automatically synchronizing opening and closing of windows of a vehicle. The systems and methods provide several benefits and advantages such as providing a simultaneous opening or closing of windows even when the window positions are not the same and/or the window switches are not activated simultaneously. Providing simultaneous closings of windows provides benefits and advantages such as avoiding experiencing multiple window closing sounds (or thuds) generated by the closing of each window at different times. These sounds may be loud and unpleasant. For example, both a driver's side window and a passenger's side window may be fully open. The driver may intend to activate a window switch for the driver's side window and a window switch for the passenger's side window at the same time so that the windows close simultaneously. However, the driver's finger may slip and the window switch corresponding to the driver's side window may be activated at a slightly earlier time than the window switch corresponding to the passenger's side window is activated. As a result, two thuds may be created—one when the driver's side window is in a driver's side window closed position and one when the passenger's side window is in a passenger's side window closed position. When the window switches are activated at slightly different times, the two thuds may occur in a rapid sequence, and may be unpleasant to hear. The automatic window synchronization system may adjust the closing of the driver's side window or the passenger's side window so that the windows close at the same time, eliminating the unpleasant multiple thuds produced by multiple windows closing asynchronously.

An exemplary system includes a first actuator configured to move the first window up to a first window closed position. The system also includes a second actuator configured to move the second window up to a second window closed position. The system also includes a window control unit connected to the first actuator and the second actuator. The window control unit is configured to receive, at a first time, an indication to close the first window. The window control unit is also configured to close the first window at a first closing rate based on the indication to close the first window, the first closing rate being a standard rate. The window control unit is also configured to receive, at a second time, an indication to close the second window. The window control unit is also configured to close the second window at a second closing rate based on the indication to close the second window, the second closing rate being the standard rate. The window control unit is also configured to adjust at least one of the first closing rate or the second closing rate, from the standard rate to an adjusted rate, when the first time and the second time are within a threshold time, such that the first window and the second window achieve their respective closed positions simultaneously.

The systems and methods disclosed herein may also be used to synchronize opening of windows of a vehicle. Audible thuds may also be produced when opening windows. The automatic window synchronization system may adjust the opening of the driver's side window or the passenger's side window so that the windows open or reach the fully open positions at the same time, eliminating unpleasant multiple thuds produced by multiple windows opening asynchronously or at different times.

FIG. 1A illustrates a block diagram of an automatic window synchronization system 100 for a vehicle. The vehicle may be an electric vehicle, an internal combustion engine vehicle, a hybrid vehicle, a fuel cell vehicle, or any combination thereof. The vehicle may be a vehicle operated by an individual, operated semi-autonomously or autonomously, operated remotely or any combination thereof. As used herein, a single reference number may be used to generally refer to one or more elements having the reference number followed by a letter. For example, window 110 may be used when describing either first window 110A or second window 110B, or window 110 may be used to refer to all windows 110A-110B collectively.

The automatic window synchronization system 100 includes, for example, a window control unit 102 connected to a first window switch 104A, a second window switch 104B, a first window position sensor 106A, a second window position sensor 106B, a first actuator 108A, a second actuator 108B, an input unit 112, an air control unit 114, an air pressure sensor 116 and a memory 118. The automatic window synchronization system 100 also includes a first window 110A connected to the first actuator 108A and the first window position sensor 106A. In some embodiments, the first window 110A is connected directly to the window control unit 102. The automatic window synchronization system 100 also includes a second window 110B connected to the second actuator 108B and the second window position sensor 106B. In some embodiments, the second window 110B is connected directly to the window control unit 102.

The window switch 104 (e.g., the first window switch 104A and/or the second window switch 104B) is connected to the window control unit 102. The window switch 104 is configured to provide an indication to close a corresponding window 110 or open a corresponding window 110. The window switch 104 may receive a physical indication from a user, and the window switch 104 communicates the indication to the window control unit 102 to open or close the corresponding window 110. The window switch 104 may be located nearby other window switches corresponding to other windows. The window switch 104 may be an automatic window switch configured to move a corresponding window 110 to a fully closed position or a fully open position based on a single indication to do so. That is, even if the window switch 104 is not activated (e.g., pushed or pressed) the entire time that corresponding window 110 is being opened or closed, the window control unit 102 opens or closes the corresponding window 110. For example, the window switch 104 may have two switch positions—automatic mode and manual mode. The automatic mode may move the corresponding window 110 to a fully closed position or a fully open position based on a single indication, regardless of a length of time the window switch is in the automatic mode position. The manual mode may move the corresponding window 110 to a closed position or an open position while the window switch 104 is in the manual mode position, and when the window switch 104 is no longer in the manual mode position, the corresponding window 110 stops or ceases to move.

The actuator 108 (e.g., the first actuator 108A and/or the second actuator 108B) is connected to the window control unit 102 and a corresponding window 110, and is configured to move the corresponding window 110 to an open position or a closed position. The actuator 108 may move the corresponding window 110 to the open position or the closed position based on receiving an instruction from the window control unit 102. The actuator 108 may include an electric motor, a reversible electric motor, an electric regulator, a track and/or combinations thereof.

The window 110 (e.g., the first window 110A and/or the second window 110B) is connected to a corresponding actuator 108 and a corresponding window position sensor 106. The window 110 is configured to cover or occupy an opening of a vehicle door. The window 110 may be any window of any vehicle that is controlled by the actuator 108. For example, the window 110 may be a window along a side of a vehicle, on the front or rear of the vehicle, or the roof of the vehicle. The window 110 is capable of being in multiple positions. As used herein, the "closed position" or "fully closed" refers to a position where the window 110 fully occupies the corresponding opening of the vehicle. The "open position" or "fully open" refers to a position where the window 110 does not occupy any portion of the opening of the vehicle. The "partially open position" or "partially closed position" refers to any position between the open position and the closed position.

The window position sensor 106 (e.g., the first window position sensor 106A and/or the second window position sensor 106B) is configured to detect window position data. The window position data may indicate a position or a location of a corresponding window 110. The window position data may be in terms of an amount of openness of the corresponding window 110. For example, window position data of 100% may indicate the corresponding window 110 is fully open, window position data of 50% may indicate the corresponding window 110 is halfway open, window position data of 25% may indicate that the corresponding window 110 is 25% open and window position data of 0% may indicate that the corresponding window 110 is closed. Conversely, window position data may be in terms of an amount the corresponding window 110 is closed (e.g., 100% indicates window 110 is fully closed, 50% indicates window 110 is halfway closed, and 0% indicates window 110 is fully open). The window position data may be in terms of a measurement associated with an amount of the window currently occupying a corresponding opening in the vehicle. For example, if the corresponding window 110 is 24 inches tall, window position data of 24 inches may indicate that the corresponding window 110 is fully closed, window position data of 12 inches may indicate that the corresponding window 110 is halfway closed, and window position data of 0 inches may indicate that the corresponding window 110 is fully open.

The input unit 112 is connected to the window control unit 102 and configured to receive input from a user. The input unit 112 may include a microphone, a keypad, a keyboard, a touchpad or any other input device. A user may input user preferences via the input unit 112. The user preferences may be stored in the memory 118. The user preferences may indicate a threshold time and/or threshold window position whereby automatic window synchronization is triggered. In some situations, when a time difference between closing two windows is sufficiently far apart, automatic window synchronization may not be desired. For example, a driver may use a first window switch to close a first window, and then two seconds later, when the first window is almost entirely closed, the driver may use a second window switch to close a second window. In this situation, it may not be desirable to slow the closing of the first window and/or accelerate the closing of the second window, such that both windows close simultaneously. Sounds generated by the closing of the first window and the second window may occur with sufficient time in between such that the sounds produced are not unpleasant or minimally unpleasant. Further, it may not be practical to leave the first window open until the second window catches up, or accelerate the closing of the second window to catch up to the first window.

The air pressure sensor 116 is connected to the window control unit 102 and is configured to detect air pressure within a passenger cabin of the vehicle or the vehicle. In particular, the air pressure sensor 116 may be configured to detect air pressure within the passenger cabin of the vehicle. The air pressure sensor 116 may be a barometer or other sensor configured to measure air pressure.

The air control unit 114 is connected to the window control unit 102 and is configured to detect a change in air pressure. The air control unit 114 is also configured to adjust the air pressure within the passenger cabin of the vehicle when a change in the air pressure is detected by the air pressure sensor 116. The closing or the opening of the window 110 may cause a change in the air pressure. The air control unit 114 may control a central air conditioning or heating system to adjust an amount of air introduced into the passenger cabin of the vehicle or to adjust an amount of air removed from the passenger cabin of the vehicle. When the window 110 closes, the air pressure inside of the cabin or the vehicle may momentarily be greater than the air pressure outside of the cabin or the vehicle. Accordingly, the air control unit 114 may emit air or remove air to compensate for the increased air pressure inside the cabin or the vehicle. When the window 110 opens, the air pressure inside of the cabin or the vehicle may momentarily be lower than the air pressure outside of the cabin or the vehicle. Accordingly, the air control unit 114 may emit air or remove air to compensate for the decreased air pressure inside the cabin or the vehicle.

While FIG. 1A illustrates two windows, actuators, window switches, and window position sensors, the vehicle may include more than two windows, actuators, window switches, and window position sensors. For example, the vehicle may have four windows (e.g., window 110), four actuators (e.g., actuator 108), four window switches (e.g., window switch 104), and four window position sensors (e.g., window position sensor 106). That is, the vehicle may have a first window controlled by a first window switch using a first actuator, where a position of the first window is detected by a first window position sensor; a second window controlled by a second window switch using a second actuator, where a position of the second window is detected by a second window position sensor; a third window controlled by a third window switch using a third actuator, where a position of the third window is detected by a third window position sensor; and a fourth window controlled by a fourth window switch using a fourth actuator, where a position of the fourth window is detected by a fourth window position sensor. The window control unit 102 may be connected to each of these four sets of windows, actuators, window switches, and window position sensors.

FIG. 1B illustrates a first window 110A, a second window 110B, a first window switch 104A and a second window switch 104B, according to an embodiment of the invention. FIG. 1B also illustrates a first window open position 150, a first window closed position 152, a second window open position 160 and a second window closed position 162.

As described herein, a user may use the first window switch 104A to move the first window 110A from the first window open position 150 to the first window closed position 152. Also as described herein, the user may use the second window switch 104B to move the second window 110B from the second window open position 160 to the second window closed position 162. The first window switch 104A may be used to move the first window 110A from the first window closed position 152 to the first window open position 150, and the second window switch 104B may be used to move the second window 110B from the second window closed position 162 to the second window open position 160. The first window switch 104A may be used to move the first window 110A from a first window partially open (or partially closed) position to the first window open position 150 or the first window closed position 152. The second window switch 104B may be used to move the second window 110B from a second window partially open (or partially closed) position to the second window open position 160 or the second window closed position 162.

In an example embodiment, the user may provide an indication to the first window switch 104A to move the first window 110A to the first window closed position 152. The user may also provide an indication to the second window switch 104B to move the second window 110B to the second window closed position 162. The first window 110A and the second window 110B may close asynchronously based on the position of the first window 110A and the position of the second window 110B and/or the timing of the indication to close the first window 110A and the timing of the indication to close the second window 110B. The asynchronous closing of the first window 110A and the second window 110B may cause multiple undesirable audible thuds. The automatic window synchronization system 100, as described herein, adjusts the closing of the first window 110A and/or the second window 110B so that the first window closed position 152 and the second window closed position 162 are achieved simultaneously. In addition, the automatic window synchronization system 100, as described herein, adjusts the opening of the first window 110A and/or the second window 110B so that the first window open position 150 and the second window open position 160 are achieved simultaneously.

Figure 2:
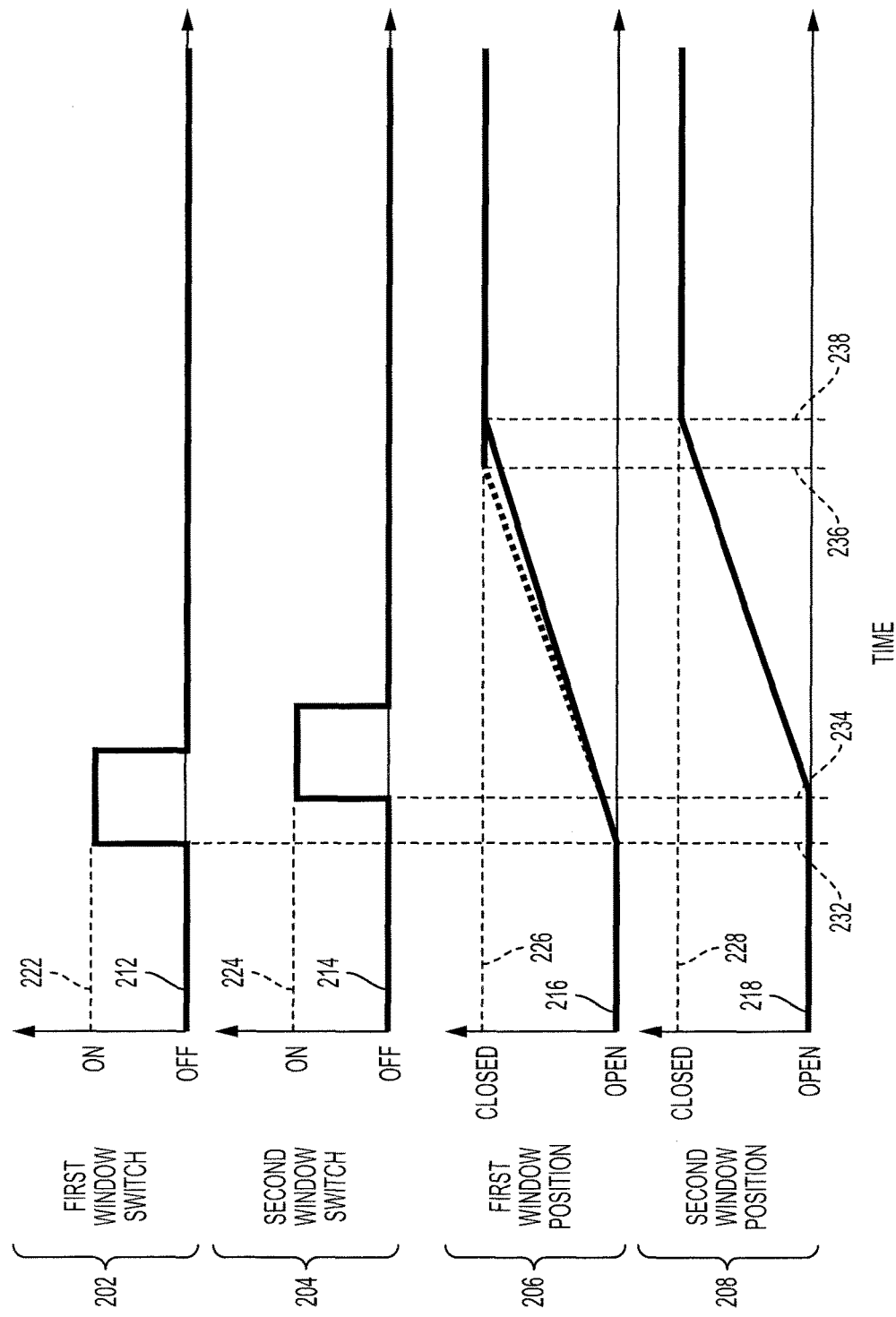
FIG. 2 illustrates graphs of window switches and window positions versus time, according to an embodiment of the invention.

FIG. 2 illustrates graphs of window switches and window positions versus time, according to an embodiment of the invention. The graphs illustrate a position of a first window switch over time (graph 202), a position of a second window switch over time (graph 204), a position of a first window over time (graph 206), and a position of a second window over time (graph 208). The first window switch and the second window switch may be similar to the first window switch 104A and second window switch 104B described herein. The first window and the second window may be similar to the first window 110A and the second window 110B described herein. The positions of the first window and the second window may be determined by respective window position sensors similar to the first window position sensor 106A and the second window position sensor 106E described herein.

As shown in graph 202, the first window switch may be in an on position 222 or an off position 212. Similarly, as shown in graph 204, the second window switch may be in an on position 224 or an off position 214. The first window switch and the second window switch may be in their respective off positions 212 and 214 when no adjustment to the windows is desired, and moved to their respective on positions 222 and 224 when an adjustment to the windows (either up or down) is desired. The on positions 222 and 224 may correspond to an indication to close the respective windows and the off positions 212 and 214 may correspond to an indication to make no movement of the position of the windows. In some embodiments, instead of on and off positions, up, down, and off positions may be used.

As shown in graph 202, the first window switch is moved from the off position 212 to the on position 222 at time 232. The first window switch communicates an indication to the window control unit 102 to move the first window to the first window closed position 226.

As shown in graph 206, the window control unit 102, upon receiving the indication to move the first window to the first window closed position at time 232, closes the first window. The first window, beginning at time 232, is moved from the first window open position 216 toward the first window closed position 226. A first window closing rate is represented by a slope of the line in graph 206. The first window closing rate is initially a standard rate at time 232.

As shown in graph 204, the second window switch is moved from the off position 214 to the on position 224 at time 234. The second window switch communicates an indication to the window control unit 102 to move a second window to the second window closed position 228.

As shown in graph 208, the window control unit 102, upon receiving the indication to move the second window to the second window closed position 228 at time 234, closes the second window. The second window, beginning at time 234, is moved from a second window open position 218 to the second window closed position 228. A second window closing rate is represented by a slope of the line in graph 208. The second window closing rate is the standard rate at time 234 and the second window is moved to the second window closed position 228 at time 238.

As shown in graph 206, at time 234, when the indication to move the second window toward the second window closed position is received by the window control unit 102, the first window closing rate is adjusted to an adjusted rate. A projection of the first window moving at the standard rate is represented by the dashed line in graph 206 between time 234 and time 236. At time 236, the first window would have moved to the first window closed position 226 if the standard rate was maintained. The adjusted rate is represented by the solid line in graph 206 between time 234 and time 238. The window control unit 102 determines the adjusted rate and adjusts the first window closing rate to the adjusted rate at time 234, when the second window switch is moved to the on position 224.

As shown in graphs 206 and 208, both the first window and the second window achieve their respective closed window positions 226 and 228 at time 238. Without the automatic window synchronization system 100, the first window and the second window would have achieved their respective closed window positions 226 and 228 at different times—times 236 and 238. As a result, successive thuds would have been created at times 236 and 238.

While FIG. 2 illustrates the closing rate of the first window slowing down at time 234 when the second window switch is activated, the closing rate of the second window may instead accelerate, such that both the first window and the second window close simultaneously at time 236.

The window control unit 102 may determine, at time 234, whether a time difference between when the first window switch and the second window switch are activated exceeds a threshold time. That is, the window control unit 102 determines whether the difference between time 232 and time 234 exceeds the threshold time. When the time difference exceeds the threshold time, the closing rate of neither the first window nor the second window are adjusted. The threshold time may be a predetermined value determined by a user, such as the driver of the vehicle, and may be input via the input unit 112.

Figure 3:
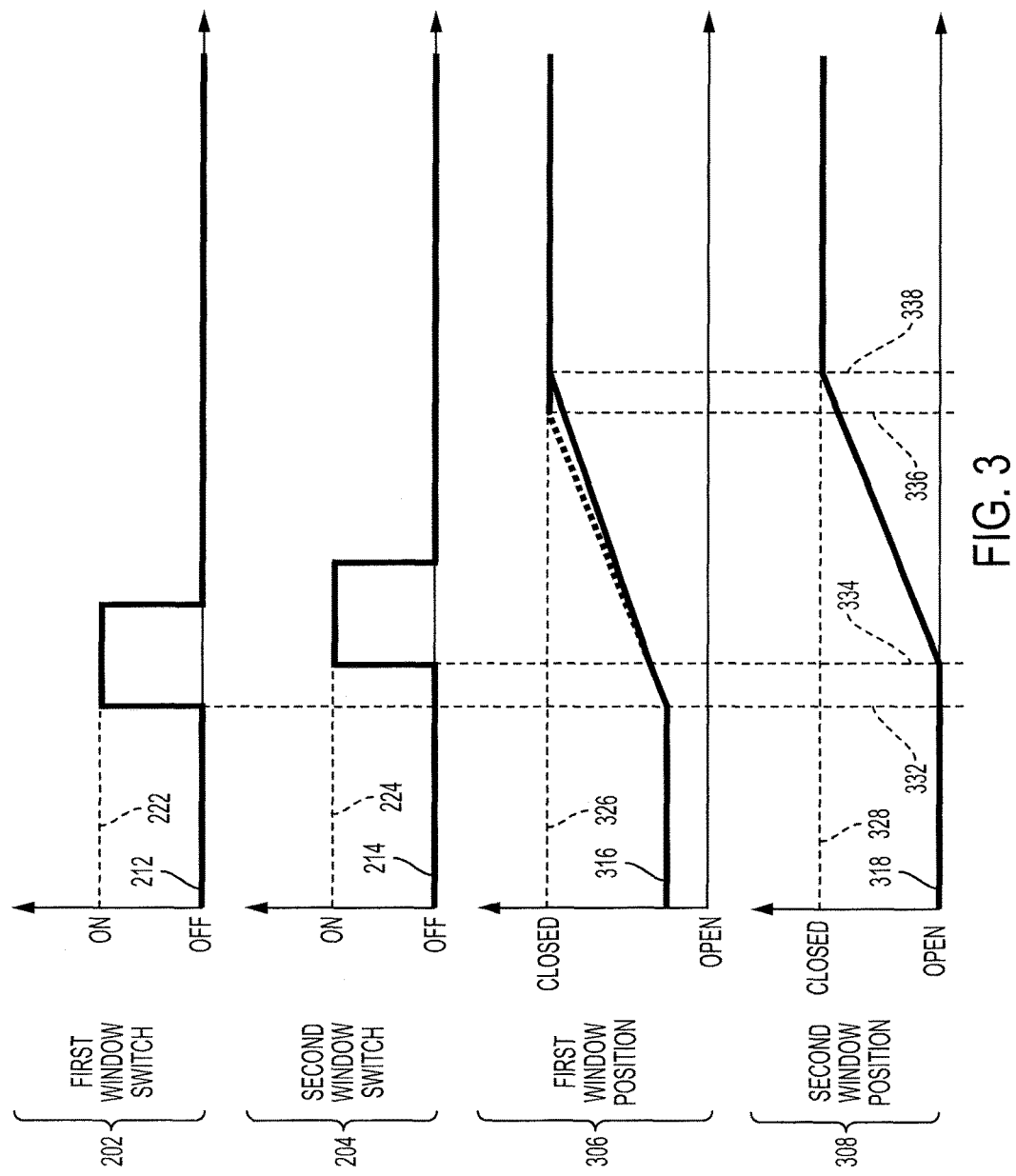
FIG. 3 illustrates graphs of window switches and window positions versus time with different initial window positions, according to an embodiment of the invention.

FIG. 3 illustrates an exemplary use of the automatic window synchronization system 100, according to an embodiment of the invention. Similar to the graphs shown in FIG. 2, a first window switch graph 202 and a second window switch graph 204 are shown. As shown in graph 202, the first window switch is moved from an off position 212 to an on position 222 at time 332. The second window switch is moved from an off position 214 to an on position 224 at time 334.

As shown in graph 306, the first window is in a first window partially open position 316 before time 332. At time 332, when the first window switch is activated, the first window is moved toward the first window closed position 326 at a first closing rate. The first closing rate is represented by the slope of the line in graph 306, and is initially a standard rate.

As shown in graph 308, the second window is in an open state 318 before time 334, when the second window switch is moved from the off position 214 to the on position 224. At time 334, the second window is moved toward the second window closed position 328 at a second closing rate, which is the standard rate.

As shown in graph 306, when the second window switch is moved from the off position 214 to the on position 224 at time 334, the window control unit 102 adjusts the closing rate of the first window to an adjusted rate between time 334 and 338, such that the first window and the second window are moved to their respective closed positions 326 and 328 simultaneously at time 338.

Similar to FIG. 2, the dashed line associated with the first window shows the first closing rate being the standard rate, and the first window would have closed, using the standard rate, at time 336.

The window control unit 102, at time 334, may determine whether the time difference between time 332 and 334 exceeds a threshold time. The window control unit 102, at time 334, may also determine whether a position difference of the first window and the second window exceeds a threshold window position. In some situations, when the time difference between time 332 and 334 and/or the position difference at time 334 exceeds their respective thresholds, the window control unit 102 does not adjust the closing rate of the first window or the second window, and each window closes at the standard rate.

While FIG. 3 illustrates the first closing rate of the first window slowing down at time 334, the second closing rate of the second window may be accelerated, such that the first window and the second window achieve their respective closed positions at time 336.

Figure 4:
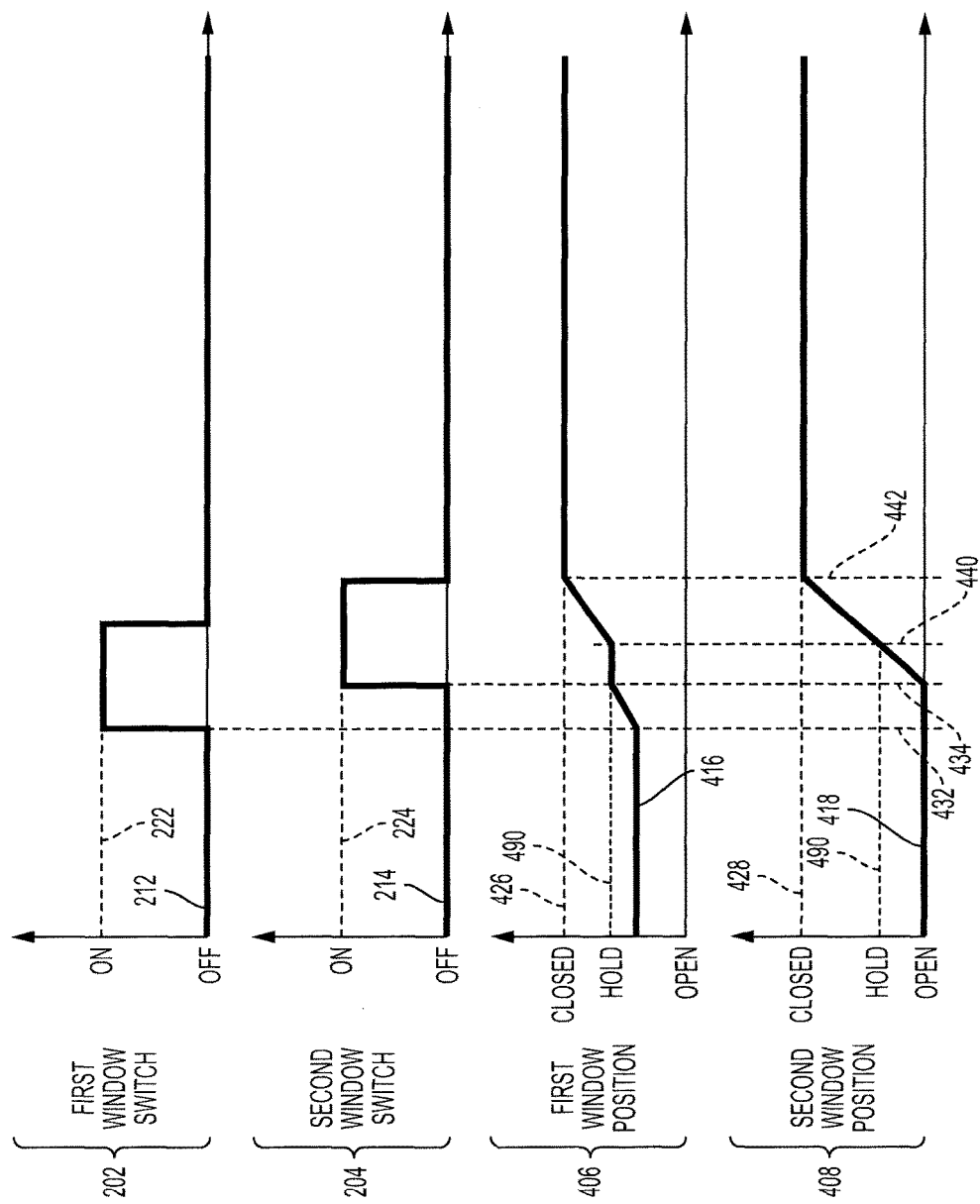
FIG. 4 illustrates graphs of window switches and window positions versus time, according to an embodiment of the invention.

FIG. 4 illustrates a further exemplary use of the automatic window synchronization system, according to an embodiment of the invention. Similar to the graphs shown in FIGS. 2 and 3, a first window switch graph 202 and a second window switch graph 204 are shown. As shown in graph 202, the first window switch is moved from an off position 212 to an on position 222 at time 432. As shown in graph 204, the second window switch is moved from an off position 214 to an on position 224 at time 434.

As shown in graph 406, the first window is in a first window partially open position 416 before time 432. At time 432, when the first window switch is activated, the first window is moved to the first window closed position 426 at a first closing rate. The first closing rate is represented by the slope of the line in graph 406, and is initially a standard rate.

As shown in graph 408, the second window is in a second window open position 418 before time 434, when the second window switch is moved from the off position 214 to the on position 224. At time 434, the second window is moved toward the second window closed position 428 at a second closing rate, which is the standard rate.

As shown in graph 406, when the second window switch is moved from the off position 214 to the on position 224 at time 434, the window control unit 102 holds the closing of the first window. The first window is held at a hold position 490 until the second window is also at the hold position at time 440. When the first window and the second window achieve the hold position 490, both the first window and the second window are moved toward their respective closed positions 426 and 428, such that they are closed simultaneously at time 442.

As shown in graphs 406 and 408, the window control unit 102 does not adjust the closing rates of the first window and the second window. The standard rate is maintained, and instead, the first window is held at the hold position 490 until the second window achieves the hold position 490 as well. Then, both the first window and the second window are closed at the standard rate so they both reach their respective closed window position at the same time.

Figure 5:
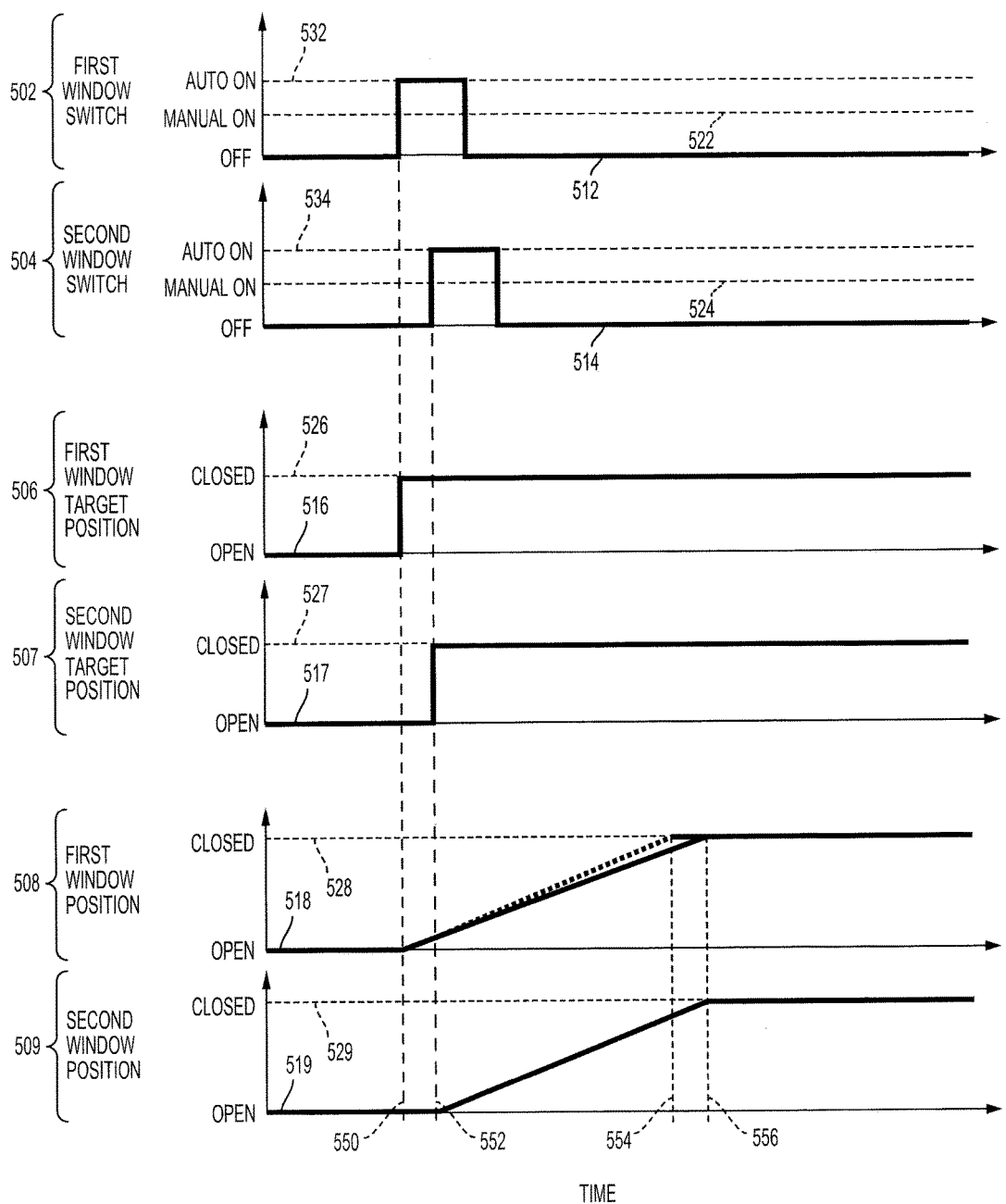
FIG. 5 illustrates graphs of window switches, window positions and window target positions versus time demonstrating power windows in automatic mode, according to an embodiment of the invention.

FIG. 5 illustrates graphs of window switches and window positions versus time, according to an embodiment of the invention. The graphs illustrate a position of a first window switch over time (graph 502), a position of a second window switch over time (graph 504), a first window target position over time (graph 506), a second window target position over time (graph 507), a position of the first window over time (graph 508), and a position of the second window over time (graph 509). The first window switch and the second window switch may be similar to the window switch 104 described herein. The first window and the second window may be similar to the window 110 described herein. The positions of the first window and the second window may be determined by respective window position sensors similar to window position sensor 106 described herein.

While the graphs illustrated in FIG. 5 are similar to the graphs illustrated in FIG. 2, the graphs of FIG. 5 include an automatic mode on position and an off position of the first and second window switches. As described herein, window switches for power windows may include two positions—an automatic mode and a manual mode. The automatic mode may move the corresponding window to the open or closed position regardless of the length of engagement of the window switch in the automatic mode on position. The manual mode may move the corresponding window to the open or closed position only during the time when the window switch is in the manual mode position.

The graphs of FIG. 5 also include window target positions. The window target positions may be established by the window control unit 102 based on receiving indications from the window switch 104. The window control unit 102 instructs the actuator 108 to move the window 110 to the window target position until the window 110 achieves the target position.

The window control unit 102 may determine the window 110 has achieved the window target position based on the window position data detected by the window position sensor 106.

As shown in graph 502, the first window switch may be in an automatic mode on position 532, a manual mode on position 522, or an off position 512. Similarly, as shown in graph 504, the second window switch may be in an automatic mode on position 534, a manual mode on position 524, or an off position 514. The first window switch and the second window switch may be in their respective off positions when no adjustment to the windows is desired, and moved to their respective on positions when an adjustment to the windows (either up or down) is desired. The on positions may correspond to an indication to close the respective windows and the off positions may correspond to an indication to make no movement of the position of the windows. In some embodiments, the terms automatic mode on and off positions, manual mode on and off positions, automatic mode up, manual mode up, automatic mode down, manual mode down, and off positions may be used.

As shown in graph 502, the first window switch is moved from the off position 512 to the automatic mode on position 532 at time 550. The first window switch communicates an indication to the window control unit 102 to move the first window to the first window closed position 528.

As shown in graph 506, the window control unit 102, upon receiving the indication to move the first window to the first window closed position at time 550, sets the first window target position to the closed position 526.

As shown in graph 508, the window control unit 102, upon setting the first window target position to the closed position 526, closes the first window. The first window, beginning at time 550, is moved from the first window open position 518 toward the first window closed position 528. A first window closing rate is represented by a slope of the line in graph 508. The first window closing rate is initially a standard rate at time 550.

As shown in graph 504, the second window switch is moved from the off position 512 to the automatic mode on position 534 at time 552. The second window switch communicates an indication to the window control unit 102 to move a second window to the second window closed position 529.

As shown in graph 507, the window control unit 102, upon receiving the indication to move the second window to the second window closed position at time 552, sets the second window target position to the closed position 527.

As shown in graph 509, the window control unit 102, upon setting the second window target position to the closed position 527, closes the second window. The second window, beginning at time 552, is moved from a second window open position 519 to a second window closed position 529. A second window closing rate is represented by a slope of the line in graph 509. The second window closing rate is the standard rate at time 552 and the second window is moved to the second window closed position 529 at time 556.

As shown in graph 508, at time 552, when the indication to move the second window toward the second window closed position is received by the window control unit 102, the first window closing rate is adjusted to an adjusted rate. A projection of the first window moving at the standard rate is represented by the dashed line in graph 508 between time 552 and time 554. At time 554, the first window would have moved to the first window closed position 528 if the standard rate was maintained. The adjusted rate is represented by the solid line in graph 508 between time 552 and time 556. The window control unit 102 determines the adjusted rate and adjusts the first window closing rate to the adjusted rate at time 552, when the second window switch is moved to the automatic mode on position 534.

While FIG. 5 illustrates the closing rate of the first window slowing down at time 552 when the second window switch is activated, the closing rate of the second window may instead accelerate, such that both the first window and the second window close simultaneously at time 554.

Figure 6:
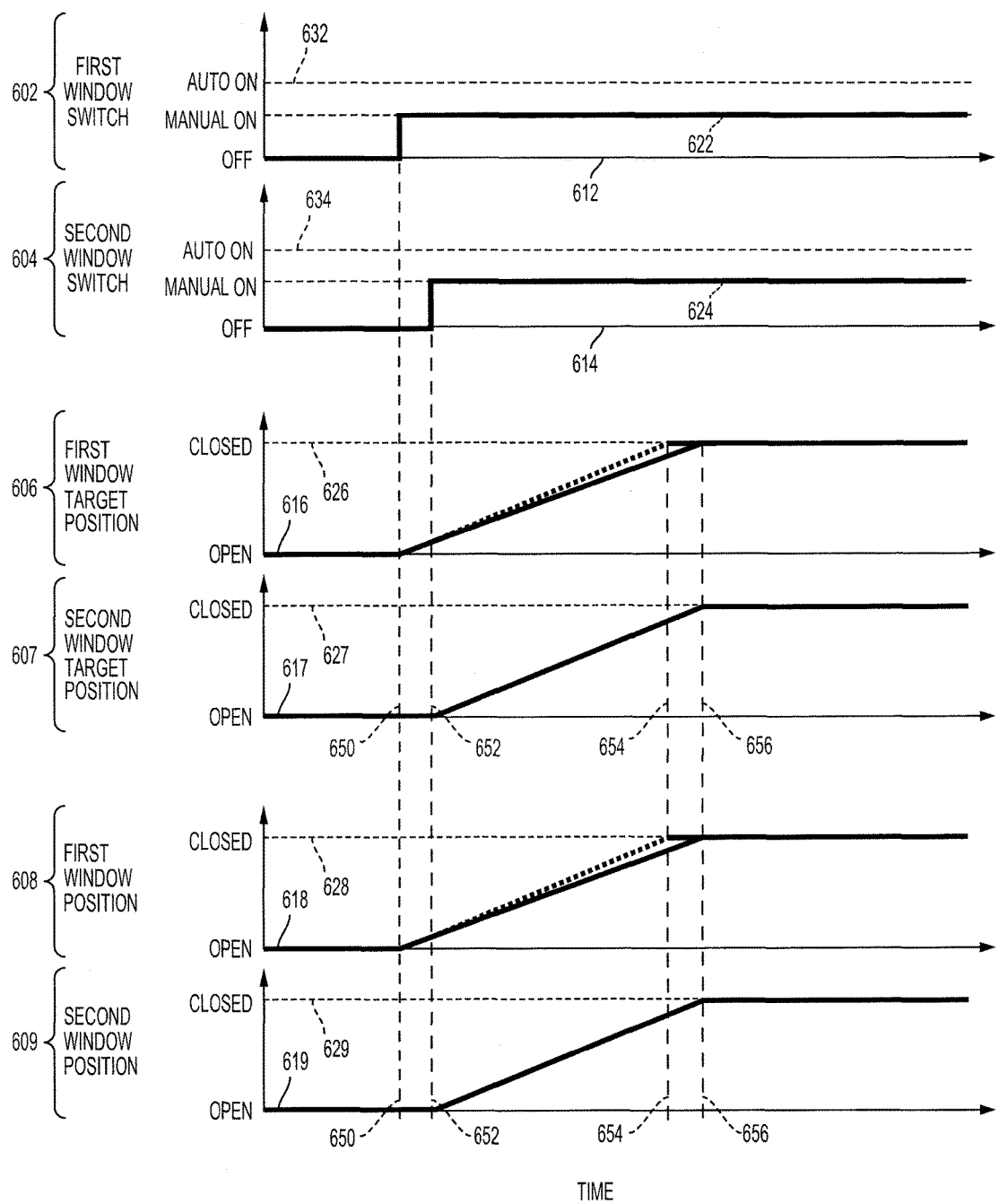
FIG. 6 illustrates graphs of window switches, window positions and window target positions versus time demonstrating power windows in manual mode, according to an embodiment of the invention.

FIG. 6 illustrates graphs of window switches and window positions versus time, according to an embodiment of the invention. The graphs illustrate a position of a first window switch over time (graph 602), a position of a second window switch over time (graph 604), a first window target position over time (graph 606), a second window target position over time (graph 607), a position of the first window over time (graph 608), and a position of the second window over time (graph 609). The first window switch and the second window switch may be similar to the window switch 104 described herein. The first window and the second window may be similar to the window 110 described herein. The positions of the first window and the second window may be determined by respective window position sensors similar to window position sensor 106 described herein.

As shown in graph 602, the first window switch is moved from the off position 612 to the manual mode on position 622 at time 650. The first window switch communicates an indication to the window control unit 102 to move the first window.

As shown in graph 606, the window control unit 102, upon receiving the indication to move the first window to the first window closed position at time 650, sets the first window target position based on the first window position and a first window closing rate. Accordingly, the first window target position graph 606 and the first window position graph 608 are similar. If the first window switch is moved from the manual mode on 622 to the off position 612 at any time before the first window is moved to the first window closed position 628, the first window ceases movement, and the first window target position and the first window position do not change. That is, when the first window switch is moved from the manual mode on position 622 to the off position 612 before the first window is moved to the first window closed position 628, the slopes of the lines in graphs 606 and 608 are zero.

As shown in graph 608, the window control unit 102 closes the first window. The first window, beginning at time 650, is moved from a first window open position 618 toward a first window closed position 628. A first window closing rate is represented by a slope of the line in graph 608. The first window closing rate is initially a standard rate at time 650.

As shown in graph 604, the second window switch is moved from the off position 614 to the manual mode on position 624 at time 652. The second window switch communicates an indication to the window control unit 102 to move a second window.

As shown in graph 607, the window control unit 102, upon receiving the indication to move the second window toward the second window closed position at time 652, sets the second window target position based on the second window position and a second window closing rate. Accordingly, the second window target position graph 607 and the second window position graph 609 are similar.

As shown in graph 609, the window control unit 102 closes the second window. The second window, beginning at time 652, is moved from a second window open position 619 toward a second window closed position 629. A second window closing rate is represented by a slope of the line in graph 609. The second window closing rate is the standard rate at time 652 and the second window is moved to the second window closed position 629 at time 656.

As shown in graph 608, at time 652, when the indication to move the second window toward the second window closed position is received by the window control unit 102, the first window closing rate is adjusted to an adjusted rate. A projection of the first window moving at the standard rate is represented by the dashed line in graph 608 between time 652 and time 654. At time 654, the first window would have moved to the first window closed position 628 if the standard rate was maintained. The adjusted rate is represented by the solid line in graph 608 between time 652 and time 656. The window control unit 102 determines the adjusted rate and adjusts the first window closing rate to the adjusted rate at time 652, when the second window switch is moved to the automatic mode on position 634.

Similarly, as shown in graph 606, at time 652, when the indication to move the second window toward the second window closed position is received by the window control unit 102, the first window target position is adjusted from a standard target position represented by the dashed line, to an adjusted target position represented by the solid line.

While FIG. 6 illustrates the closing rate of the first window slowing down at time 652 when the second window switch is activated, the closing rate of the second window may instead accelerate, such that both the first window and the second window close simultaneously at time 654.

Figure 7:
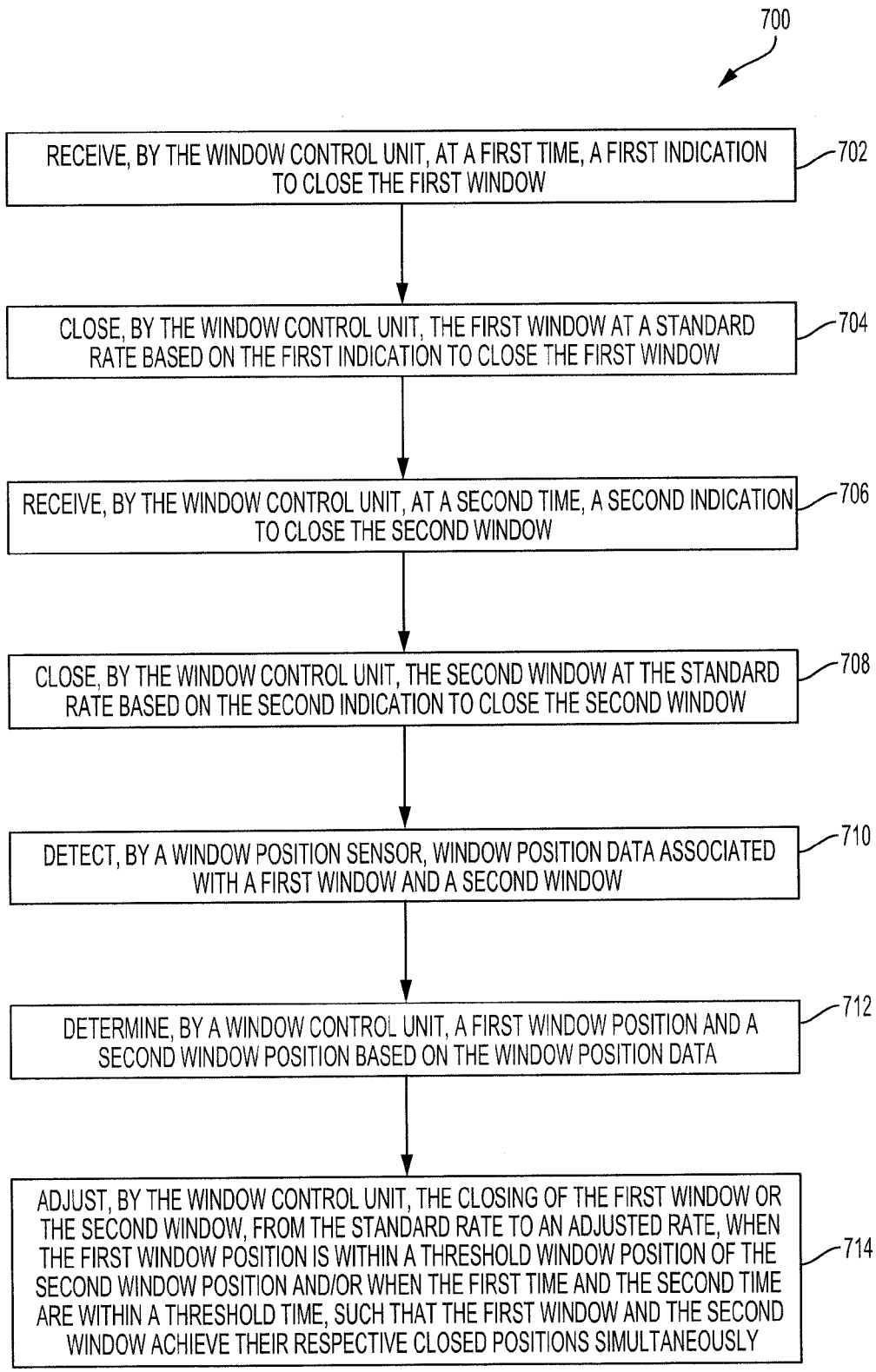
FIG. 7 illustrates an example of a flowchart describing an operation of the automatic window synchronization system, according to an embodiment of the invention.

FIG. 7 illustrates a flowchart of a method of operation of the automatic window synchronization system 100, according to an embodiment of the invention. The method 700 shown in FIG. 7 may be used by a vehicle as described herein.

The window control unit 102 receives, at a first time, an indication to close a first window (e.g., window 110) (step 702). The indication to close the first window may be communicated by a first window switch (e.g., window switch 104) to the window control unit 102. For example, the first window switch may be a switch corresponding to a driver's side window, and the first window switch may be located on a driver's side door.

The window control unit 102 closes the first window at a first closing rate based on the indication to close the first window (step 704). The window control unit 102 closes the first window using a first actuator (e.g., actuator 108) configured to move the first window to the first window closed position. The first closing rate is initially a standard rate. The standard rate may be determined by a manufacturer of the vehicle or the automatic window synchronization system 100 or by a user of the vehicle or the automatic window synchronization system 100. For example, the standard rate may be closing two inches of the window every second, such that a 12-inch window is moved from the open position to the closed position in six seconds. In some embodiments, the first closing rate may be initially set or moved to an adjusted rate without operating at the standard rate.

The window control unit 102 receives, at a second time, an indication to close the second window (step 706). The indication to close the second window may be communicated by a second window switch (e.g., the window switch 104) to the window control unit 102. For example, the second window switch may be a switch corresponding to a passenger's side window, and the second window switch may be located on a driver's side door next to the first window switch for the driver's side window.

The window control unit 102 closes the second window at a second closing rate based on the indication to close the second window (step 708). The window control unit 102 closes the second window using a second actuator (e.g., actuator 108) configured to move the second window to the second window closed position. The second closing rate is initially the same standard rate used by the first window. In some embodiments, the second closing rate may be initially set or moved to an adjusted rate without operating at the standard rate.

A window position sensor 106 detects window position data associated with the first window and the second window (step 710). The window position data may indicate a position of a particular window, such as open, closed, partially open/partially closed, or a degree of openness of the window. For example, the window position data may include an identifier for each window and a number corresponding to the percentage that the window is open (e.g., 100 for fully open, 50 for halfway open, and 0 for fully closed) or an amount the window is open (e.g., 2 inches when only 2 inches of the window is exposed or 8 inches when 8 inches of the window is exposed).

The window control unit 102 determines a first window position and a second window position based on the window position data (step 712). The window control unit 102 may parse the window position data to determine the first window position and the second window position. For example, the window control unit 102 may determine that the first window is 95% open and the second window is 100% open, or that 10 inches of the first window is exposed or 12 inches of the second window is exposed.

The window control unit 102 adjusts at least one of the first closing rate or the second closing rate, from the standard rate to an adjusted rate, when the first time and the second time are within a threshold time, and/or when the first window position and the second window position are within a threshold window position, such that the first window and the second window achieve their respective closed position simultaneously (step 714).

For example, the threshold time may be 0.5 seconds, the threshold window position may be 3 inches, and the window position sensor detects the first window is fully open and 2.5 inches of the second window is exposed. A driver of the vehicle may move a first window switch to the on position to close the first window, and 0.25 seconds later, the driver of the vehicle may move a second window switch to the on position to close the second window. For the first 0.25 seconds that the first window is being moved toward the first window closed position by the first actuator, the first closing rate is a standard rate of 2 inches per second. Then, the window control unit 102 receives the indication to close the second window, and adjusts the closing of the first window or the second window such that both windows close simultaneously. The window control unit 102 may slow down the first closing rate from the standard rate of 2 inches per second to 1.5 inches per second, and the second closing rate may be the standard rate of 2 inches per second. The window control unit 102 may maintain the standard rate of 2 inches per second for the first closing rate and accelerate the second closing rate to 2.75 inches per second.

Figure 8:
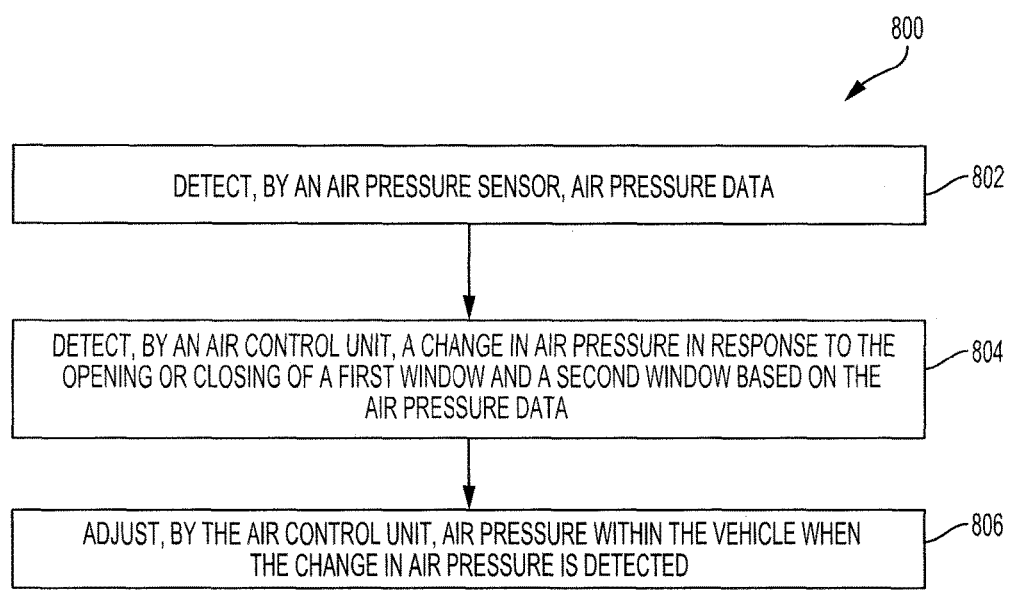
FIG. 8 illustrates an example of a flowchart describing an operation of an air pressure adjustment of the automatic window synchronization system, according to an embodiment of the invention.

FIG. 8 illustrates a flowchart of a method of operation of the automatic window synchronization system, according to an embodiment of the invention. The method 800 shown in FIG. 8 may be used by a vehicle.

An air pressure sensor 116 detects air pressure data (step 802). The air pressure sensor 116 may detect air pressure data within a passenger cabin of the vehicle. In some embodiments, the air pressure sensor 116 is a barometer configured to detect air pressure data relating to air pressure sensed by occupants of the vehicle.

An air control unit 114 uses the air pressure data to determine a change in air pressure in response to closing of one or more windows (step 804). When one or more windows are opened or closed, changes in air pressure may be caused and may create discomfort for occupants of the vehicle.

When a change in air pressure is detected, the air control unit 114 adjusts air pressure within the vehicle (step 806). In some embodiments, the air control unit 114 adjusts heating or cooling systems to adjust the air pressure within the vehicle.

When one or more windows are open, air pressure within the vehicle may be higher than the air pressure outside of the vehicle. The air control unit 114 may adjust air pressure within the vehicle in different ways, as the windows are closing. As lower temperature air is associated with lower air pressure, the air control unit 114 may emit air that is colder than the air outside of the vehicle to compensate for a detected change in air pressure. The air control unit 114 may remove air within the vehicle to compensate for the detected change in air pressure.

When one or more windows are closed, air pressure within the vehicle may be lower than the air pressure outside of the vehicle. The air control unit 114 may adjust the air pressure within the vehicle in different ways, as the windows are opened. As higher temperature air is associated with higher air pressure, the air control unit 114 may emit air that is warmer than the air outside of the vehicle to compensate for a detected change in air pressure. The air control unit 114 may add air within the passenger cabin or the vehicle to compensate for the detected change in air pressure.

The window control unit 102 may communicate an indication to the air control unit 114 to adjust the air pressure based on the window position data, or the air control unit 114 may adjust the air pressure independent of receiving an indication.

The automatic window synchronization system 100 may be used to synchronize the opening of windows as well as the closing of windows. Similar to the thuds created by closing windows, undesirable thuds may be created when asynchronously opening windows. For example, when a user of the vehicle or the automatic window synchronization system 100 engages two window switches within a threshold amount of time, the two windows may achieve their respective open positions at two separate times, creating two separate thuds close together in time. In order to eliminate the undesirable creating of multiple thuds when opening windows, the window control unit 102 may adjust a window opening rate of one or more windows to synchronize the opening of the windows.

Figure 9:
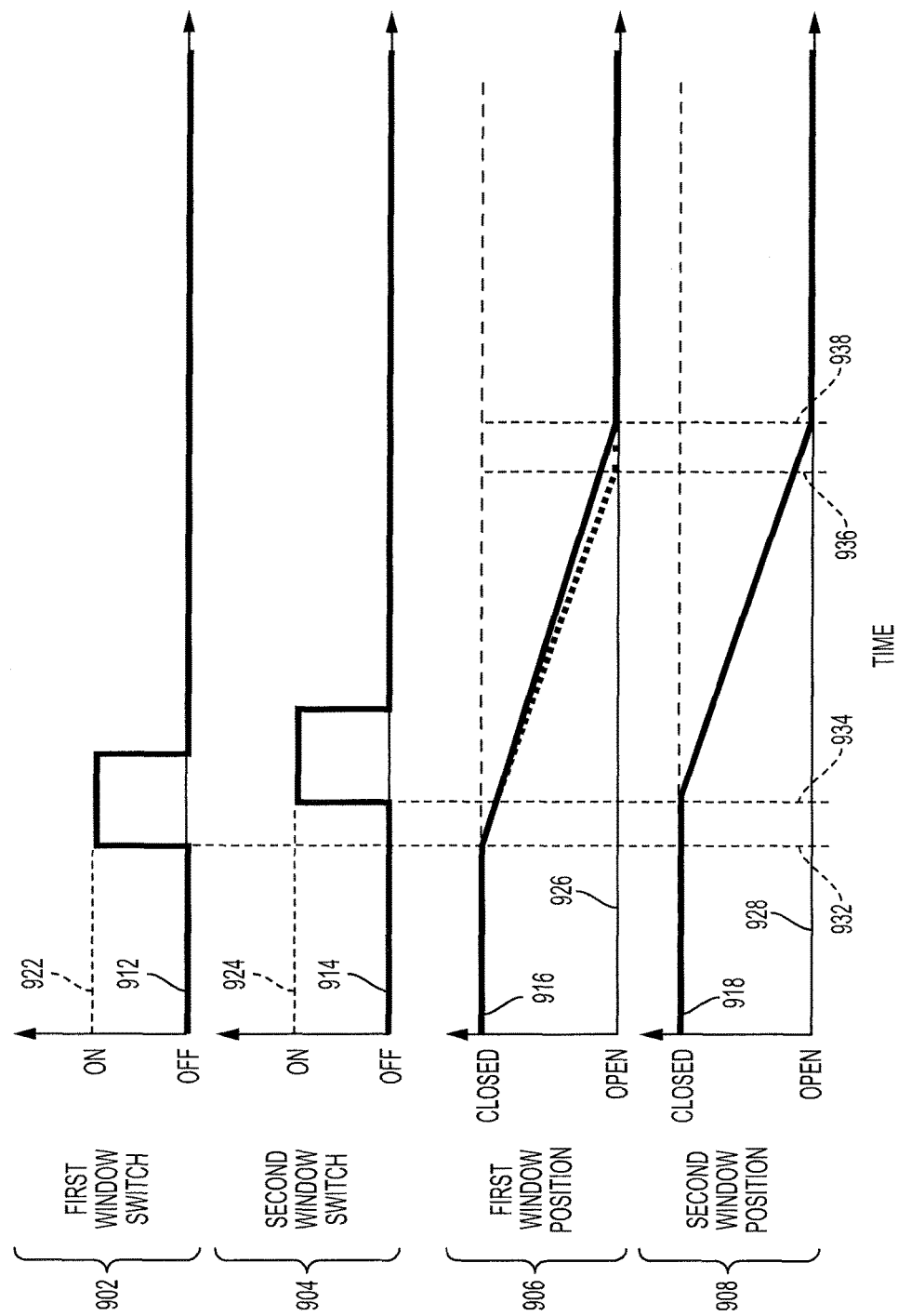
FIG. 9 illustrates graphs of window switches and window positions for synchronized opening of windows, according to an embodiment of the invention.

FIG. 9 illustrates graphs of window switches and window positions versus time, according to an embodiment of the invention. The graphs illustrate a position of a first window switch over time (graph 902), a position of a second window switch over time (graph 904), a position of a first window over time (graph 906), and a position of a second window over time (graph 908). The first window switch and the second window switch may be similar to the window switch 104 described herein. The first window and the second window may be similar to the window 110 described herein. The positions of the first window and the second window may be determined by respective window position sensors similar to the window position sensor 106 described herein.

As shown in graph 902, the first window switch may be in an on position 922 or an off position 912. Similarly, as shown in graph 904, the second window switch may be in an on position 924 or an off position 914. The on positions 922 and 924 may correspond to an indication to open the respective windows.

As shown in graph 902, the first window switch is moved from the off position 912 to the on position 922 at time 932. The first window switch communicates an indication to the window control unit 102 to move the first window to the first window open position 926.

As shown in graph 906, the window control unit 102, upon receiving the indication to move the first window to the first window open position at time 932, opens the first window.

The first window, beginning at time 932, is moved from the first window closed position 916 toward the first window open position 926. A first window opening rate is represented by a slope of the line in graph 906. The first window opening rate is initially a standard rate at time 932.

As shown in graph 904, the second window switch is moved from the off position 914 to the on position 924 at time 934. The second window switch communicates an indication to the window control unit 102 to move a second window to the second window open position 928.

As shown in graph 908, the window control unit 102, upon receiving the indication to move the second window to the second window open position 928 at time 934, opens the second window. The second window, beginning at time 934, is moved from a second window closed position 918 to a second window open position 928. A second window opening rate is represented by a slope of the line in graph 908. The second window opening rate is the standard rate at time 934 and the second window is moved to the second window open position 928 at time 938.

As shown in graph 906, at time 934, when the indication to move the second window toward the second window open position is received by the window control unit 102, the first window opening rate is adjusted to an adjusted rate. A projection of the first window moving at the standard rate is represented by the dashed line in graph 906 between time 934 and time 936. At time 936, the first window would have moved to the first window open position 926 if the standard rate was maintained. The adjusted rate is represented by the solid line in graph 906 between time 934 and time 938. The window control unit 102 determines the adjusted rate and adjusts the first window opening rate to the adjusted rate at time 934, when the second window switch is moved to the on position 924.

As shown in graphs 906 and 908, both the first window and the second window achieve their respective open window positions 926 and 928 at time 938. Without the automatic window synchronization system 100, the first window and the second window would have achieved their respective open window positions 926 and 928 at different times—times 936 and 938. As a result, successive thuds would have been created at times 936 and 938.

While FIG. 9 illustrates the opening rate of the first window slowing down at time 934 when the second window switch is activated, the opening rate of the second window may instead accelerate, such that both the first window and the second window open simultaneously at time 936.

The window control unit 102 may determine, at time 934, whether a time difference between when the first window switch and the second window switch are activated exceeds a threshold time. That is, the window control unit 102 determines whether the difference between time 932 and time 934 exceeds the threshold time. When the time difference exceeds the threshold time, the opening rate of neither the first window nor the second window are adjusted. The threshold time may be a predetermined value determined by a user, such as the driver of the vehicle, and may be input via the input unit 112.

The graphs of FIG. 9 are window opening counterparts to the graphs of FIG. 2, which illustrate window closings. The graphs of FIGS. 3, 4, 5 and 6 may be similarly adjusted to illustrate window opening.

Figure 10:
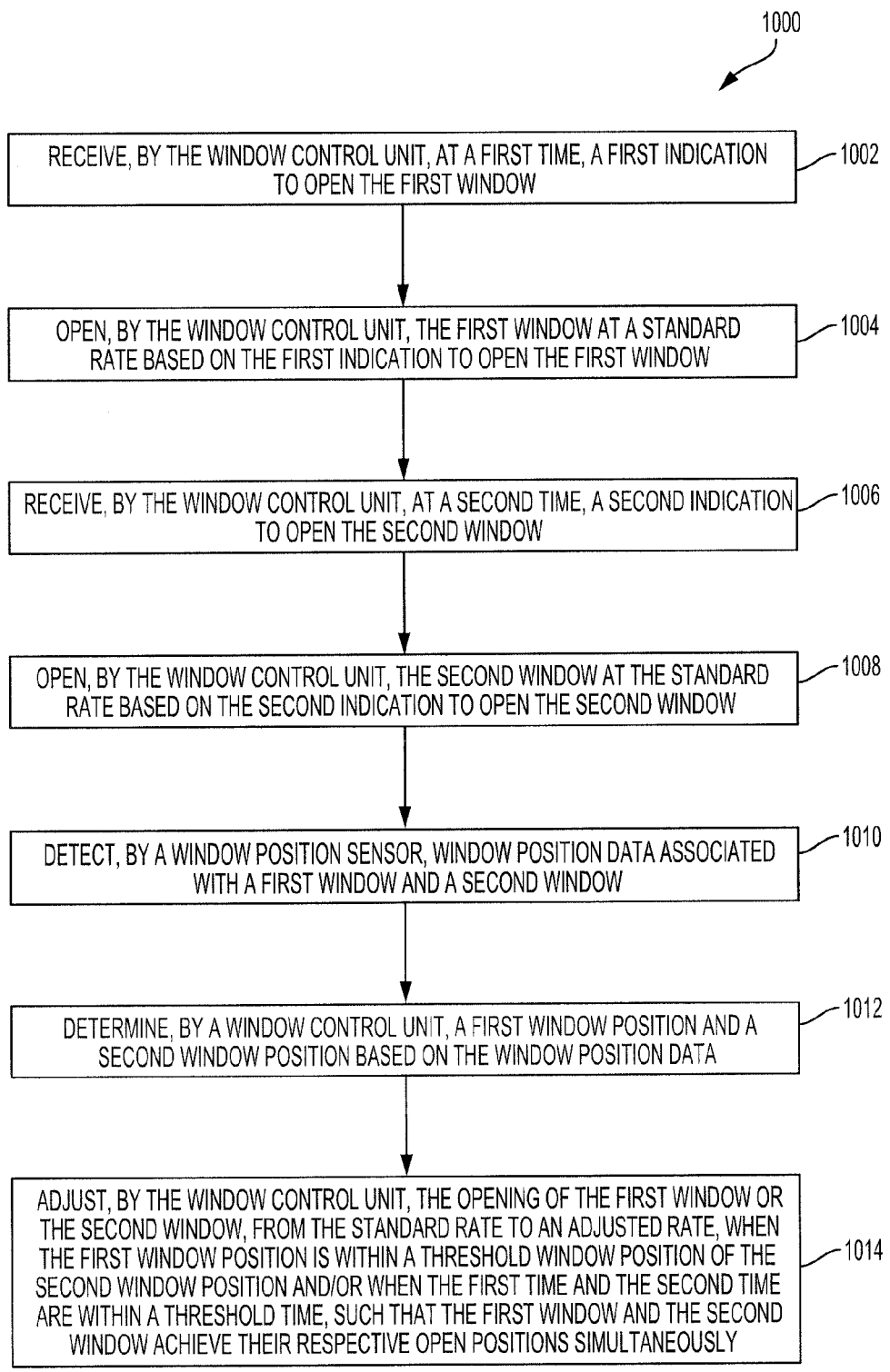
FIG. 10 illustrates an example of a flowchart describing a synchronized opening operation of the automatic window synchronization system, according to an embodiment of the invention.

FIG. 10 illustrates a flowchart of a method of operation of the automatic window synchronization system 100, according to an embodiment of the invention. The method 1000 shown in FIG. 10 may be used by a vehicle.

The window control unit 102 receives, at a first time, an indication to open a first window (e.g., window 110) (step 1002). The indication to open the first window may be communicated by a first window switch (e.g., window switch 104) to the window control unit 102.

The window control unit 102 opens the first window at a first opening rate based on the indication to open the first window (step 1004). The window control unit 102 opens the first window using a first actuator (e.g., actuator 108) configured to move the first window to the first window open position. The first opening rate is initially a standard rate. The standard rate may be determined by a manufacturer of the vehicle or the automatic window synchronization system 100 or by a user of the vehicle or the automatic window synchronization system 100.

The window control unit 102 receives, at a second time, an indication to open the second window (step 1006). The indication to open the second window may be communicated by a second window switch (e.g., window switch 104) to the window control unit 102.

The window control unit 102 opens the second window at a second opening rate based on the indication to open the second window (step 1008). The window control unit 102 opens the second window using a second actuator (e.g., actuator 108) configured to move the second window to the second window open position. The second opening rate is initially the same standard rate used by the first window.

A window position sensor 106 detects window position data associated with the first window and the second window (step 1010). The window control unit 102 determines a first window position and a second window position based on the window position data (step 1012). The window control unit 102 may parse the window position data to determine the first window position and the second window position.

The window control unit 102 adjusts at least one of the first opening rate or the second opening rate, from the standard rate to an adjusted rate, when the first time and the second time are within a threshold time, and/or when the first window position and the second window position are within a threshold window position, such that the first window and the second window achieve their respective open positions simultaneously (step 1014).

In some embodiments, a single window switch 104 controls multiple windows simultaneously, and a preset, user-defined height may be determined and stored in the memory 118 such that when the window switch 104 is activated, one or more windows achieve one or more predetermined positions. For example, a window configuration where all windows allow an opening of one inch may be stored in the memory 118, and when the window switch 104 is activated, the window control unit 102 controls the one or more windows using one or more actuators, such that all windows achieve the particular window configuration. In another example, activating the single window switch 104 triggers all of the windows to each achieve their respective closed positions simultaneously, using systems and methods described herein.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that the scope shall not be restricted, except in light of the appended claims and their equivalents.

What is claimed is:

1. A system for closing a first window and a second window of a vehicle, the system comprising:
   a first actuator configured to move the first window to a first window closed position;
   a second actuator configured to move the second window to a second window closed position;
   a window control unit connected to the first actuator and the second actuator, the window control unit configured to:
      receive, at a first time, an indication to close the first window,
      close the first window at a first closing rate based on the indication to close the first window, the first closing rate being a standard rate,
      receive, at a second time after the first time, an indication to close the second window,
      close the second window at a second closing rate based on the indication to close the second window, the second closing rate being the standard rate, and
      when a difference between the first time and the second time is less than or equal to a threshold time difference, adjust at least one of the first closing rate or the second closing rate, from the standard rate to an adjusted rate, so that the first window closed position and the second window closed position are achieved simultaneously.

2. The system of claim 1, further comprising:
   a first window switch connected to the window control unit, the first window switch configured to provide the indication to close the first window; and
   a second window switch connected to the window control unit, the second window switch configured to provide the indication to close the second window.

3. The system of claim 1, further comprising an input unit configured to receive user preference data, and
   wherein the threshold time difference is based on the user preference data.

4. The system of claim 1, further comprising:
   a first window position sensor connected to the first window and configured to detect window position data of the first window; and a second window position sensor connected to the second window and configured to detect window position data of the second window, and wherein the window control unit is connected to the first window position sensor and the second window position sensor, and further configured to:
determine a first window position of the first window based on the window position data of the first window,
determine a second window position of the second window based on the window position data of the second window, and
when a difference between the first window position and the second window position is less than or equal to a threshold window position difference and when the difference between the first time and the second time is less than or equal to the threshold time difference, adjust at least one of the first closing rate or the second closing rate, from the standard rate to the adjusted rate.

5. The system of claim 4, wherein the window control unit is further configured to determine the adjusted rate based on the window position data of the first window, the window position data of the second window, the first time, and the second time.

6. The system of claim 4, further comprising an input unit configured to receive user preference data, and
wherein the threshold time difference and the threshold window position difference are based on the user preference data.

7. The system of claim 1, further comprising:
an air pressure sensor configured to detect air pressure data; and
an air control unit configured to:
detect, based on the air pressure data, a change in air pressure in response to the closing of the first window and the second window, and
adjust air pressure within the vehicle when the change in air pressure is detected.

8. A vehicle having a first window and a second window, the vehicle comprising:
a first actuator configured to move the first window to a first window closed position;
a second actuator configured to move the second window to a second window closed position; and
a window control unit connected to the first actuator and the second actuator, the window control unit configured to:
receive an indication to close the first window at a first time,
close the first window in response to receiving the indication to close the first window,
receive an indication to close the second window at a second time after the first time,
close the second window in response to receiving the indication to close the second window, and
when a difference between the first time and the second time is less than or equal to a threshold time difference, adjust at least one of the closing of the first window or the closing of the second window such that the first window closed position and the second window closed position are achieved simultaneously.

9. The vehicle of claim 8, further comprising:
a first window switch connected to the window control unit, the first window switch configured to provide the indication to close the first window; and a second window switch connected to the window control unit, the second window switch configured to provide the indication to close the second window.

10. The vehicle of claim 8, further comprising an input unit configured to receive user preference data, and
wherein the threshold time difference is based on the user preference data.

11. The vehicle of claim 8, further comprising:
a first window position sensor connected to the first window and configured to detect window position data of the first window; and
a second window position sensor connected to the second window and configured to detect window position data of the second window, and
wherein the window control unit is connected to the first window position sensor and the second window position sensor, and further configured to:
determine a first window position of the first window based on the window position data of the first window,
determine a second window position of the second window based on the window position data of the second window, and
when a difference between the first window position and the second window position is less than or equal to a threshold window position difference and when the difference between the first time and the second time is less than or equal to the threshold time difference, adjust at least one of the closing of the first window or the closing of the second window.

12. The vehicle of claim 11, further comprising an input unit configured to receive user preference data, and
wherein the threshold time difference and the threshold window position difference are based on the user preference data.

13. The vehicle of claim 8, wherein the adjusting at least one of the closing of the first window or the closing of the second window comprises accelerating the closing of the first window or accelerating the closing of the second window.

14. The vehicle of claim 8, wherein the adjusting at least one of the closing of the first window or the closing of the second window comprises delaying the closing of the first window or delaying the closing of the second window.

15. The vehicle of claim 8, further comprising:
an air pressure sensor configured to detect air pressure data; and
an air control unit configured to:
detect, based on the air pressure data, a change in air pressure in response to the closing of the first window and the second window, and
adjust air pressure within the vehicle when the change in air pressure is detected.

16. A system for closing a first window and a second window of a vehicle, the system comprising:
a first actuator configured to move the first window to a first window closed position;
a second actuator configured to move the second window to a second window closed position;
a first window position sensor connected to the first window and configured to detect window position data of the first window;
a second window position sensor connected to the second window and configured to detect window position data of the second window;

a window control unit connected to the first actuator, the second actuator, the first window position sensor, and the second window position sensor, the window control unit configured to:
- simultaneously receive an indication to close the first window and an indication to close the second window,
- determine a first window position of the first window based on the window position data of the first window,
- determine a second window position of the second window based on the window position data of the second window, and
- when a difference between the first window position and the second window position is less than or equal to a threshold window position difference, adjust at least one of a closing of the first window or a closing of the second window such that the first window closed position and the second window closed position are achieved simultaneously.

17. The system of claim 16, further comprising:
a first window switch connected to the window control unit, the first window switch configured to provide the indication to close the first window; and
a second window switch connected to the window control unit, the second window switch configured to provide the indication to close the second window.

18. The system of claim 16, further comprising a single switch connected to the window control unit and configured to provide the indication to close the first window and the second window.

19. The system of claim 16, wherein the adjusting at least one of the closing of the first window or the closing of the second window comprises accelerating the closing of the first window or accelerating the closing of the second window.

20. The system of claim 16, wherein the adjusting at least one of the closing of the first window or the closing of the second window comprises delaying the closing of the first window or delaying the closing of the second window.

* * * * *